United States Patent
Mueller et al.

(10) Patent No.: US 8,490,365 B2
(45) Date of Patent: Jul. 23, 2013

(54) AIRCRAFT SIDE FAIRING

(75) Inventors: Rainer Mueller, Rosengarten (DE);
Georg Muehlthaler, Hamburg (DE)

(73) Assignee: AIRBUS Deutschland GmbH, Hamburg (DE)

( * ) Notice: Subject to any disclaimer, the term of this patent is extended or adjusted under 35 U.S.C. 154(b) by 508 days.

(21) Appl. No.: 12/308,926

(22) PCT Filed: Jun. 22, 2007

(86) PCT No.: PCT/EP2007/056239
§ 371 (c)(1),
(2), (4) Date: Aug. 25, 2009

(87) PCT Pub. No.: WO2007/147885
PCT Pub. Date: Dec. 27, 2007

(65) Prior Publication Data
US 2009/0304979 A1 Dec. 10, 2009

Related U.S. Application Data

(60) Provisional application No. 60/815,949, filed on Jun. 23, 2006.

(30) Foreign Application Priority Data

Jun. 23, 2006 (DE) .......................... 10 2006 028 956

(51) Int. Cl.
*E04C 2/54* (2006.01)
(52) U.S. Cl.
USPC . 52/783.1; 52/784.14; 52/793.1; 244/123.13; 244/133; 248/69; 248/72; 248/73

(58) Field of Classification Search
USPC ................... 52/783.1, 784.14, 784.15, 788.1, 52/791.1, 793.1, 794.1; 244/118.5, 118.6, 244/130, 119, 120, 123.1, 133, 123.13; 428/69, 428/72, 73
See application file for complete search history.

(56) References Cited

U.S. PATENT DOCUMENTS 2,837,779 A 9/1953 Jacobs
4,167,598 A 9/1979 Logan et al.
(Continued)

FOREIGN PATENT DOCUMENTS

DE 199 06 774 8/2000
DE 10027925 A1 12/2001
(Continued)

OTHER PUBLICATIONS

Japanese Office Action dated Jul. 4, 2012 for related application Japanese Application—JP Publication No. 2009-515892.
(Continued)

*Primary Examiner* — Jeanette E Chapman
*Assistant Examiner* — James Buckle, Jr.
(74) *Attorney, Agent, or Firm* — Maginot, Moore & Beck

(57) ABSTRACT

The invention relates to an aircraft side fairing, with a component (9) in the form of individual hollow chambers (12, 13, 14) which are arranged essentially in a preferably curved plane and are arranged between two cover layers (1, 2), wherein a gastight film which completely encases the component (9) with the hollow chambers (12, 13, 14) is provided and, after application of a vacuum to evacuate the hollow chambers (12, 13, 14), surrounds the component (9) with the hollow chambers in a gastight manner.

15 Claims, 4 Drawing Sheets

U.S. PATENT DOCUMENTS

| | | | |
|---|---|---|---|
| 4,468,423 A | 8/1984 | Hall | |
| 6,358,590 B1 * | 3/2002 | Blair et al. | 428/73 |
| 6,830,796 B2 * | 12/2004 | Murray et al. | 428/73 |
| 2004/0200571 A1 * | 10/2004 | Yamaguchi et al. | 156/292 |
| 2005/0126699 A1 | 6/2005 | Yen et al. | |
| 2005/0252552 A1 | 11/2005 | Pineau et al. | |
| 2006/0008611 A1 * | 1/2006 | Shen et al. | 428/73 |

FOREIGN PATENT DOCUMENTS

| | | |
|---|---|---|
| DE | 10 2004 011 614 | 2/2005 |
| DE | 102006002248 A1 | 7/2007 |
| EP | 1157 824 | 11/2001 |
| EP | 1258 343 | 11/2002 |
| EP | 1258 344 | 11/2002 |
| EP | 1258344 A2 | 11/2002 |
| JP | 2002019022 A | 1/2002 |
| JP | 2002337256 A | 11/2002 |
| JP | 2002340280 A | 11/2002 |
| JP | 2006 150647 | 6/2006 |
| RU | 2021457 C1 | 10/1994 |
| RU | 2061925 C1 | 6/1996 |
| WO | WO 02/103127 | 12/2002 |
| WO | WO 2006/083314 | 8/2006 |

OTHER PUBLICATIONS

German Patent Office, Office Action in related case No. DE 102006028956, dated Feb. 18, 2013, Munich, Germany.

* cited by examiner

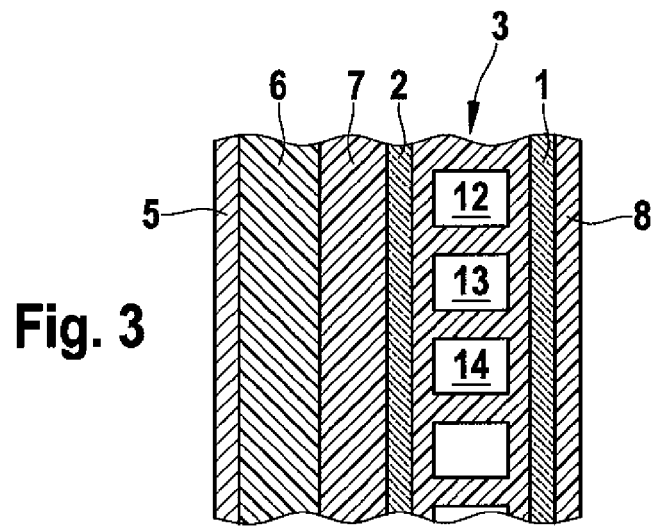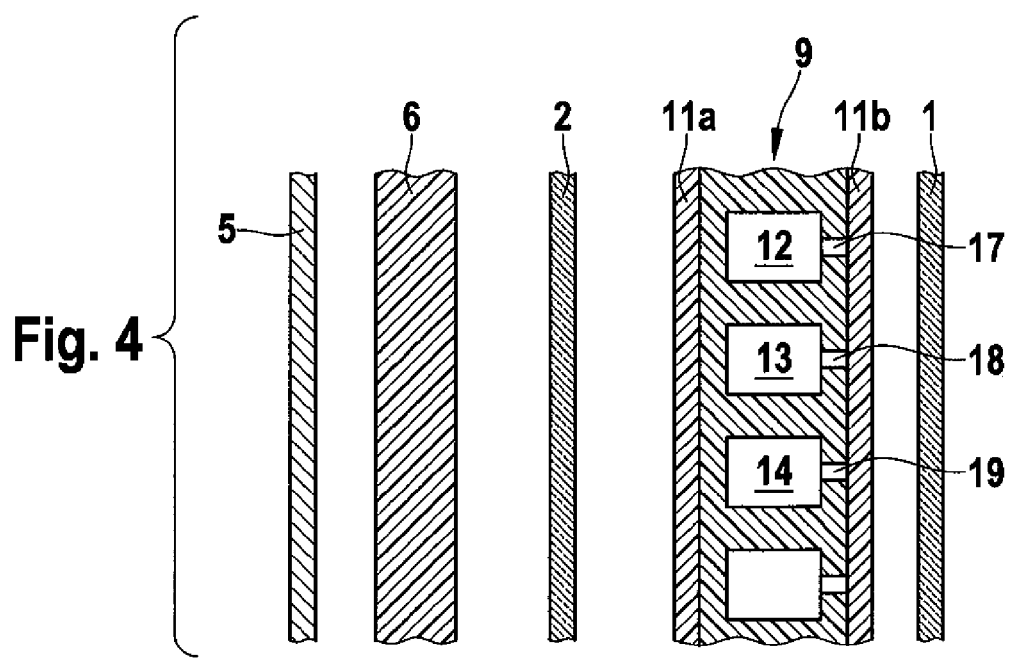

AIRCRAFT SIDE FAIRING

This application claims the benefit of German Application DE 10 2006 028 956.0, filed Jun. 23, 2006, and the U.S. Provisional Application Ser. No. 60/815,949, filed Jun. 23, 2006.

FIELD OF THE INVENTION

The invention relates to an aircraft side fairing with a core material, in particular in the form of individual chambers which are arranged essentially in a plane and are enclosed between two cover layers, with an insulating layer facing the outside of the aircraft and a decorative layer facing the aircraft cabin.

BACKGROUND OF THE INVENTION

Known aircraft side fairings are composed of a core material, in particular in the form of individual chambers which are arranged essentially in a plane and are enclosed between two cover layers, with an insulating layer facing the outside of the aircraft and a decorative layer facing the aircraft cabin. The core material in this case is composed of chambers, in particular of honeycomb hollow chamber structures of resin-impregnated nonmetallic material. In side fairings of this type, the cover layers are arranged above and below the honeycomb structure and are adhesively bonded thereto. The cover layers are composed of glass fibre fabric impregnated with synthetic resin. A core material of this type, which is closed on its upper and lower sides by cover layers, is used as a semi-finished product for interior panels in the construction of passenger aircraft. The construction described for an aircraft side fairing permits relatively lightweight components of high strength. A drawback is that, due to the arrangement of core material and air chambers between the two cover layers, a material-specific thermal conduction value is produced which has a thermal conductivity of approx. 0.06 W/mK in the case of customary side fairings.

The thermal insulating effect of side fairings of the type described is determined by the "heat transfer coefficient" which is calculated essentially from the quotient of thermal conductivity $\lambda$ and the thickness of the component. Since the side fairings have relatively low thickness, components or side fairing components are generally produced with a low insulating effect, and so additional insulation has to be provided on the rear side or on the outwardly facing side of the side fairings. Therefore, in the case of known side fairings, a primary insulation and, in addition, a secondary insulation are provided in order to achieve the necessary surface temperatures which have a crucial effect on the thermal comfort of the passengers.

The installation of secondary insulation between the primary insulation and the core material means that a construction space is additionally required, thus reducing the space provided in the passenger cabin and increasing the weight of the aircraft. Additional weight at the same time means losses in the aircraft performance. In addition, the installation of additional insulation in the form of secondary insulation disadvantageously requires a separate manufacturing step during the production of a side wall panel.

SUMMARY

One of the objects of the invention is to provide an aircraft side fairing, with which the disadvantages of conventional side fairings are avoided and a simultaneous improvement in the insulation properties is achieved.

Accordingly, an aircraft side fairing comprises a component defining individual hollow chambers that are arranged essentially in a curved or uncurved plane and are arranged between two cover layers, and further comprises a gastight film surrounding the component, wherein said gastight film surrounds said hollow chambers while said cover layers are arranged on the outer surface of said film, and wherein said film surrounds the hollow chambers in a gastight manner after application of a vacuum for evacuation of the hollow chambers.

A method for producing an aircraft side fairing using a component with hollow chambers comprise: subjecting the component with hollow chambers to a vacuum, the hollow chambers being evacuated by said subjection of the component with the hollow chambers to a vacuum; encasing the component with a gastight film; and subsequently removing the vacuum, with the gastight film applying itself tightly to the component.

Thus a side fairing for aircraft is provided, in which the core material is evacuated, thus substantially improving the insulating properties in comparison to conventional side fairings. According to a first embodiment of the invention, the hollow chambers are subjected to a vacuum and are subsequently closed by a cover layer, and therefore the vacuum is maintained within the hollow chambers. A gastight film which surrounds the hollow chambers and preferably the cover layers ensures that the vacuum is permanently maintained within the hollow chambers. The film may enclose the entire component, i.e. the cover layers with the core material located therein, such that all air remains withdrawn from the component comprising core material and cover layers.

According to a further embodiment, a cover layer is provided in the form of a perforated grid in such a manner that each hole of the perforated grid is assigned a hole, which may be in the center point of each hollow chamber. In this manner, air is drawn out of the hollow chambers via the perforated grid, after which the holes or openings are closed in a hermetically sealed manner, after the evacuation has ended, by the side facing the perforated grid being closed by the film which is impregnated with resin preferably on its side facing the perforated grid.

According to a further embodiment of the side fairing, "vacuum insulation panels (VIP)" are used. As compared with the above-described embodiments, these panels take on the function of the core material of honeycomb hollow chambers and are connected fixedly to the cover layers, for example by adhesive bonding or laminating in. In this case, the cover layers serve to mechanically protect the vacuum film against destruction of the same. In this case, the components are not necessarily of flat design, but may be of slightly curved design.

In a further embodiment, the rear side and/or the front side of the side fairing is/are designed in such a manner that it has a high degree of reflectivity of heat radiation. This can take place, for example, by vapour deposition of the rear surface or use of a special, low-emitting film on the cover layer in accordance with DE-10027925-C2. The advantage is the further reduction in the radiant heat loss of the side fairing.

With the aircraft side fairing according to the invention, the thickness of the insulating layers can be decisively reduced, and therefore the aircraft cabin can be installed in the aircraft fuselage to a lesser depth and a spacious aircraft cabin can be provided. As a consequence of the hollow chambers being under vacuum, the aircraft side fairings according to the invention have a significantly improved insulating effect for the same weight, thus also reducing production costs and the weight of the aircraft in addition to saving on installation space.

The use of VIP panels as core material is advantageous in so far as they contain microporous material, such as silica, and have very good acoustic damping properties.

Preferred embodiments of the aircraft side fairing according to the invention are described below with reference to the drawing in order to explain further features.

BRIEF DESCRIPTION OF THE DRAWINGS

FIG. 3 shows a schematic sectional illustration through an aircraft side fairing together with the aircraft skin;

FIG. 4 shows an exploded detailed illustration of a first embodiment of the components of an aircraft side fairing;

In the figures, the same reference numbers refer to identical or functionally identical components unless otherwise stated.

DETAILED DESCRIPTION OF THE INVENTION

Figure 1:
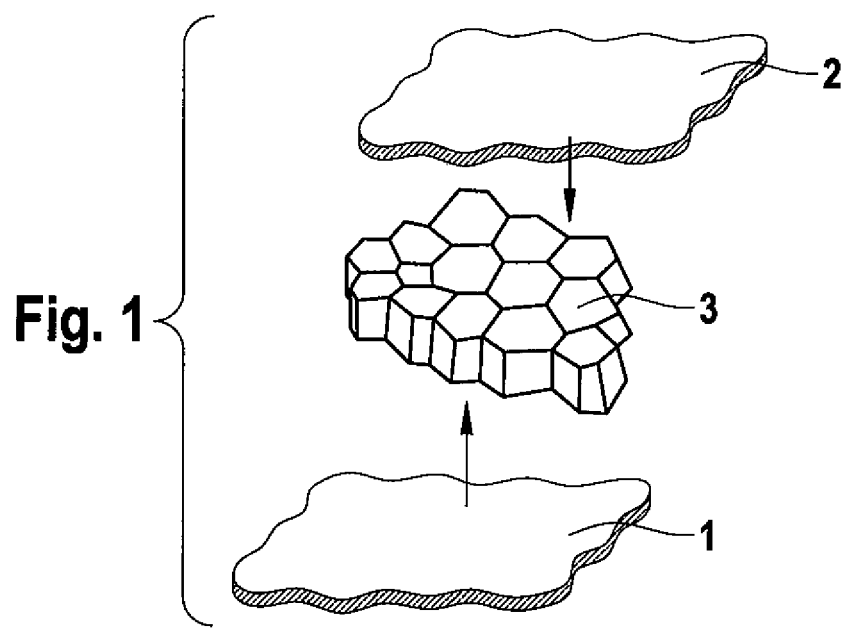
FIG. 1 shows a schematic, perspective illustration of a known core material.
Figure 2:
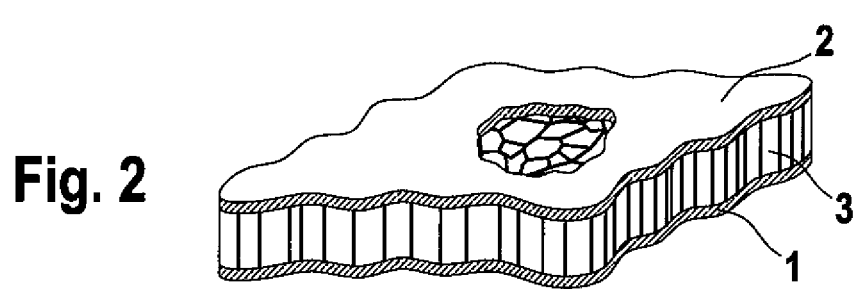
FIG. 2 shows an illustration corresponding to FIG. 1 with cover layers placed on to the core material.

Reference is made below to FIGS. 1 to 3 which show a sectional illustration of a conventional side fairing. According to FIG. 1, the core material for an aircraft side fairing comprises a first cover layer 1 and a second cover layer 2 between which a core material 3 in the form of hollow chambers, which are located in a plane, if appropriate a curved plane, and have a honeycomb structure, is arranged. The honeycomb structure 3 and the hollow chambers formed by the latter are composed of a resin-impregnated, nonmetallic material while the cover layers 1, 2, which are adhesively bonded on to the hollow chambers 3, are produced from glass fibre fabric impregnated with synthetic resin. FIG. 2 shows the structure produced from the components 1, 2, 3 according to FIG. 1 after adhesive bonding, from which it is apparent that the cover layers 1, 2 are provided largely parallel to each other and enclose the hollow chambers 3 in the manner of a sandwich. The cover layers 1, 2 and the hollow chambers 3 are located in a slightly curved plane.

FIG. 3 shows a schematic sectional view through a known aircraft side fairing which adjoins the aircraft skin 5 in the form of a metal sheet or of another material, such as, for example, carbon fibre reinforced plastic. The side fairing is composed of primary insulation 6 and secondary insulation 7, the cover layer 2, the hollow chambers 12-14, and the further cover layer 1. A decorative layer 8 is usually provided on the inside of the side wall fairing. The side fairing is therefore produced from the components 2, 6, 7, 8 and the hollow chamber structure, which is referred to in general by 3.

Preferred embodiments of aircraft side fairings according to the invention are described below with reference to FIGS. 4-6. The same reference numbers are used for identical parts as compared with FIGS. 1 to 3.

According to FIG. 4, primary insulation 6 adjoins the skin or the metal sheet of the aircraft body 5. A component 9 which has a hollow chamber structure which essentially corresponds to the hollow chamber structure 3 described with reference to FIGS. 1 to 3, but has evacuated cavities 12-14 in the final state is located between the cover layers 2 and 1. According to the invention, air is sucked out of the individual hollow chambers or honeycombs 12, 13, 14 etc., which are only partially indicated in FIG. 4. In order to maintain the resultantly produced vacuum in the hollow chambers 12, 13, 14 etc., the hollow chamber structure is surrounded by the gastight film 11 which accordingly bears tightly against the hollow chamber structure 9 and ensures that the vacuum in the hollow chambers 12, 13, 14 etc. is maintained. In this embodiment, the cover layers 1, 2 are subsequently placed, and may be adhesively bonded, on to the component 9. FIG. 4 shows the component 9 together with the laterally illustrated film sections 11a, 11b which completely surround the component 9. After production of the vacuum in the hollow chambers 12, 13, 14 and surrounding the hollow chamber structure 3 by means of the film 11 or 11a, 11b, the film 11 is therefore tightly applied to the component 9 and seals the latter, with the vacuum in the hollow chambers 12, 13, 14 being retained. This state is illustrated in FIG. 4. In this embodiment, the cover layers 1, 2 are subsequently adhesively bonded on to the component 9 with the film sections 11a, 11b or the film 11 being enclosed, the cover layers 1, 2 serving at the same time as mechanical protection of the film 11 to the outside.

In order to ensure evacuation of the hollow chambers, i.e. the penetration of vacuum into the hollow chambers 12, 13, 14, the hollow chambers can be provided with openings 17, 18, 19 which reach outwards and are closed by the film 11 and, in particular, by the film section 11b illustrated on the right in FIG. 4. In one particular embodiment, the film is impregnated with resin in the region of the film section 11b, on the side facing the component 9, as a result of which the film section 11b is readily connected to the component surface provided with the openings 17, 18, 19.

Figure 5A:
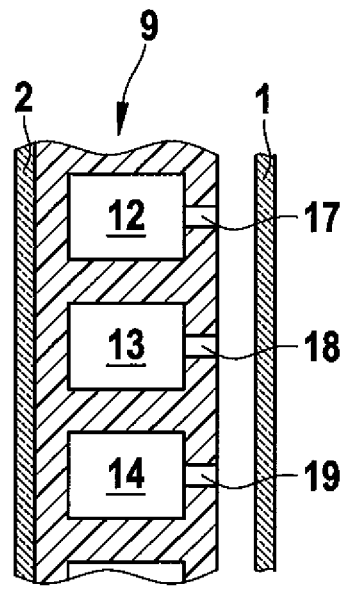
FIGS. 5a, 5b show schematic illustrations of an embodiment modified over FIG. 4.

According to a further embodiment as per FIG. 5a, the component is connected or adhesively bonded to the cover layer 2. The hollow chambers 12, 13, 14 etc. are respectively provided with openings 17, 18, 19 etc. at a predetermined point, for example centrally, on the surface facing the cover layer 3. In this embodiment, air is withdrawn from the hollow chambers 12, 13, 14 etc., whereupon the cover layer 1 is applied to the core material in order to close the openings 17, 18, 19 etc. The cover layer 1 is then located directly on the core material or the component 9, as per FIG. 5b. This structure is surrounded by the gastight film 11a, 11b and ensures that the vacuum within the component 9, i.e. within the hollow chambers 13, 14, is maintained.

Figure 5B:
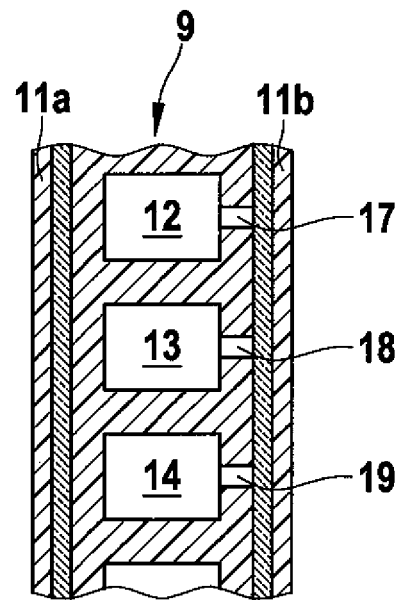
Figure 6:
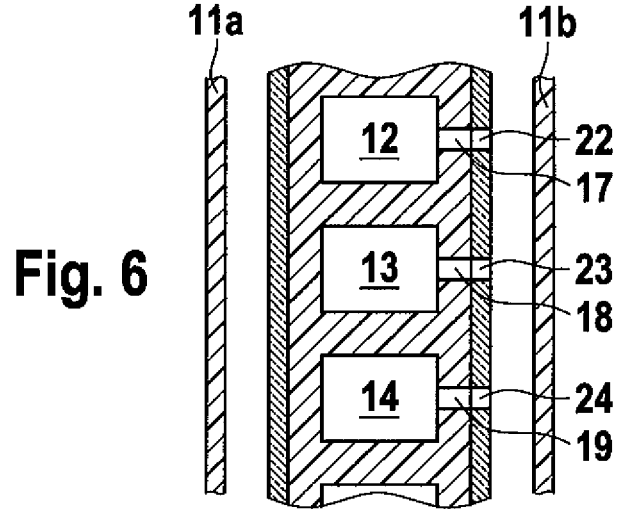
FIG. 6 shows a further embodiment of the invention.

FIG. 6 shows a further modified embodiment of the invention. In this embodiment, as compared with FIGS. 5a and 5b, the cover layer 1 is designed as a perforated grid in such a manner that each opening 17, 18, 19 in the hollow chambers 12, 13, 14 is assigned a corresponding hole 22, 23, 24. The openings 17, 18, 19 in this case are located for example centrally in each hollow chamber 12, 13, 14 and are aligned with the holes 22, 23, 24.

In all of the embodiments, the gastight film with its film sections 11a, 11b completely surrounds the component 9, with the film being guided during the production of the component 9 around the component 9 in a vacuum chamber in the manner of a bag, if appropriate with the cover layers 1, 2 being enclosed, as described above. After the vacuum is removed, the film is applied tightly around the component 9 and completely surrounds the component 9 and, if appropriate, with the cover layers 1 and/or 2 arranged on the component 9 being enclosed. As already described, the cover layers 1, 2 may also be provided laterally outside the film 11, which includes the advantage of the film containing mechanical protection by the cover layers 1, 2.

Figure 7:
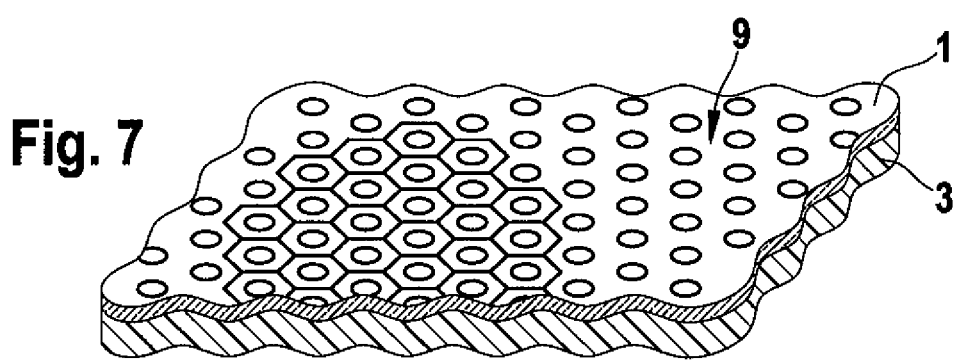
FIG. 7 shows a perspective illustration of the embodiment according to FIG. 6.

FIG. 7 shows a schematic perspective view of the embodiment shown in FIG. 6 before the gastight film 11 or 11a, 11b is applied.

After evacuation of the component 9 is finished, the film 20a, 20b rests tightly on the cover layers 1, 2 counter to the position according to FIG. 6 and surrounds the component, which comprises the cover layers 1, 2 and the core material, completely and in a gastight manner.

In all of the embodiments of the invention, after the hollow chambers are evacuated, tight contact between the core material and the gastight film 11 is provided in order to ensure a gastight closure and to maintain the vacuum in the hollow chambers 12, 13, 14 of the component 9.

According to the present invention, the component, which is referred to by 9, in the form of e.g. honeycomb hollow chambers 12, 13, 14 is evacuated in a vacuum chamber, with the hollow chambers 12, 13, 14 having at least one opening 17, 18, 19 for the purpose of evacuating the hollow chamber space. After the evacuation in a vacuum chamber, the component 9 is surrounded by the gastight film 11 and can then be removed from the vacuum chamber for the purpose of further processing, with the gastight film 11 sealing the openings 17, 18, 19 of the hollow chambers 12, 13, 14 as soon as the vacuum chamber is ventilated, as a consequence of which the hollow chambers 12, 13, 14 maintain their vacuum.

According to a further embodiment, the component 9 is vented through the openings 17, 18, 19 in the hollow chambers 12, 13, 14, with the cover layer 2 already being fastened to the component 9. The cover layer 1 is applied to the relevant surface of the component 9 with the openings 17, 18, 19 and closes the openings 17, 18, 19, which point from the hollow chambers in the direction of the cover layer 1 (FIG. 6), before the vacuum is removed. In addition, the two cover layers 1, 2, which surround the component 9 in the manner of a sandwich, are surrounded by a gastight film 11 which, on account of the ventilation of the vacuum chamber, is applied closely to the cover layers 1, 2, with the latter being enclosed (FIGS. 5a, 5b).

In a further embodiment, the cover layer 1 is for example provided with the openings 22, 23, 24 which are aligned with the openings 17, 18, 19 in the hollow chambers, and therefore the air can be sucked out of the hollow chambers 12, 13, 14 via the cover layer 1 in the form of a perforated grid. The component 9 together with the cover layer 2 and the cover layer 1 is subsequently surrounded by the gastight film 11 which is applied tightly to the cover layers 1, 2 as a consequence of the vacuum chamber being vented (FIG. 6).

According to a further embodiment, the component 9 with the hollow chambers 12, 13, 14 is exposed to a vacuum, with the component 9 being provided at least on one side with a cover layer, for example the cover layer 2, and the evacuation of the hollow chambers 12, 13, 14 taking place via the openings 17, 18, 19 formed in the hollow chambers. The component 9 is subsequently surrounded together with the cover layer 2 by a gastight film 11 which, owing to the venting of the vacuum chamber, is applied tightly to the outer surfaces of the component 9, with the cover layer 2 being enclosed, and at the same time closes the openings 17, 18, 19 of the hollow chambers 12, 13, 14.

In all of the embodiments, the effect achieved is that the hollow chambers 12, 13, 14 are evacuated and that the vacuum in the hollow chambers 12, 13, 14 is maintained by means of the gastight film 11.

In comparison to a side fairing according to FIG. 3, which is provided facing inwards from the sheet-metal skin 5 to the inside of the cabin, the use of the structural element 9 according to the invention makes it possible to avoid at least the secondary insulation layer 7.

The thermal conductivity of customary side fairings is around approx. 0.04 to 0.06 W/mK while the thermal conductivity of Side fairings with the novel structural element 9 with evacuated cavities is around 0.008 W/mK.

Instead of the components 9 with evacuated hollow chambers, use can also be made according to the invention of "vacuum insulation panels (VIP)" which take over the required static strength of the honeycomb core according to conventional configurations and obtain their strength by adhesive bonding to or laminating in the cover layers 1, 2. In this case, the cover layers 1, 2 serve at the same time to mechanically protect the vacuum films against their destruction. These VIP panels may have a nonplanar form, i.e. they can be used as an integrated, slightly curved lining component.

VIP structural elements of this type are composed of a porous filling core which can be subjected to a pressure load and can be evacuated. The filling core is present here in the form of pressed powder, glass fibres or an open-pore foam which is welded in a vacuum chamber into a gastight film, i.e. a panel of this type is already surrounded by a gastight film and is then provided, according to the invention, with the cover layers 1, 2 in order to produce the component 9.

If required, the gastight film 11 is closed by thermal sealing after being placed around the component 9, in order to prevent air from entering the interior of the gastight film after removal of the vacuum.

Accordingly, the component 9 according to the invention, which is illustrated in FIG. 4 et seq. as an essentially planar element, may also have a curved or slightly curved shape in accordance with the curvature of the skin 5.

In a further refinement of the invention, the rear side and/or the front side of the side fairing is/are designed in such a manner that it has a high degree of reflectivity of heat radiation. This can take place, for example, by vapour deposition of the rear surface or use of a special, low-emitting film on the cover layer, in accordance with DE_10027925_C2. The advantage is the further reduction in the radiant heat loss of the side fairing.

Although the present invention has been described in the present case with reference to preferred exemplary embodiments, it is not restricted thereto, but rather can be modified in diverse ways.

The invention claimed is:

1. An aircraft side fairing comprising a component defining individual hollow chambers that are arranged essentially in a curved or uncurved plane and are arranged between two cover layers, further comprising a gastight film surrounding the component,
    wherein one of the cover layers is provided in the form of a perforated grid and defines holes which are adjacent to and aligned in communication with openings into the hollow chambers, wherein the hollow chambers are evacuated entirely through said holes in the perforated grid, and wherein said film surrounds the hollow chambers and at least said one of the cover layers in a gastight manner after application of a vacuum for evacuation of the hollow chambers.

2. The aircraft side fairing according to claim 1, wherein the hollow chambers are of honeycomb shape.

3. The aircraft side fairing according to claim 1, wherein the gastight film surrounds the component, with at least said one cover layer being enclosed.

4. The aircraft side fairing according to claim 1, wherein the gastight film surrounds the component in a gastight manner, with the two cover layers being enclosed.

5. The aircraft side fairing according to claim 1, wherein at least one of the surfaces of the gastight film, which surface faces the component, is impregnated with resin.

6. The aircraft side fairing according to claim 1, wherein the openings in the component are provided at least in the direction of one of the cover layers.

7. The aircraft side fairing according to claim 1, wherein the gastight film surrounds the component, and in that the film is sealed laterally by cover layers.

8. The aircraft side fairing according to claim 1, wherein the rear side and/or front side have/has a high degree of reflectivity of heat radiation.

9. The aircraft side fairing according to claim 1, wherein said plane is a curved plane.

10. A method for producing an aircraft side fairing using a component with hollow chambers, the method comprising:
subjecting the component with hollow chambers to a vacuum, the hollow chambers being evacuated by said subjection of the component with the hollow chambers to a vacuum;
encasing the component with a gastight film; and
subsequently removing the vacuum, with the gastight film applying itself tightly to the component,
wherein the component is provided with a cover layer in the form of a perforated grid defining holes which are adjacent to and aligned in communication with openings into the hollow chambers, whereby the hollow chambers are evacuated entirely through said holes in the perforated grid, and wherein the component, including the cover layer in the form of a perforated grid, is surrounded by the gastight film.

11. The method according to claim 10, wherein, before the vacuum is removed, the component is provided with a cover layer on one or on two sides.

12. The method according to claim 10, wherein the hollow chambers are provided with openings, and in that, during the application of a vacuum, the openings are closed by a cover layer or by a gastight film before the vacuum is removed.

13. The method according to claim 10, wherein the gastight film used is a film which is provided with a resin layer at least in that region of the component in which openings to the cavities are provided.

14. The method according to claim 10, wherein, after the component is surrounded by means of the gastight film and after the vacuum is released, lateral cover layers are attached.

15. An aircraft side fairing comprising:
a core component defining a plurality of individual hollow chambers that are arranged essentially in a curved or uncurved plane, the hollow chambers having openings in said plane;
two cover layers, each of which extends across a respective side of the core component; and
a gastight film surrounding the core component;
wherein one of the cover layers is provided in the form of a perforated grid defining holes which are adjacent to and aligned in communication with the openings in the core component into the hollow chambers, wherein the hollow chamber are evacuated entirely through the perforated grid; and
wherein said gastight film surrounds the hollow chambers and the perforated grid in a gastight manner after application of a vacuum for evacuation of the hollow chambers.

* * * * *